(12) United States Patent
Ratcliff

(10) Patent No.: US 11,685,384 B2
(45) Date of Patent: Jun. 27, 2023

(54) DRIVER ALERTNESS DETECTION METHOD, DEVICE AND SYSTEM

(71) Applicant: Tobii AB, Danderyd (SE)

(72) Inventor: Andrew Ratcliff, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 17/226,551

(22) Filed: Apr. 9, 2021

(65) Prior Publication Data
US 2021/0347364 A1 Nov. 11, 2021

(30) Foreign Application Priority Data

Apr. 9, 2020 (SE) .................................. 2030120-6

(51) Int. Cl.
| | |
|---|---|
| *B60W 40/08* | (2012.01) |
| *H04N 13/128* | (2018.01) |
| *B60W 50/16* | (2020.01) |
| *G06F 3/01* | (2006.01) |
| *G06V 20/59* | (2022.01) |
| *G06V 40/19* | (2022.01) |
| *B60W 50/14* | (2020.01) |

(52) U.S. Cl.
CPC ............ *B60W 40/08* (2013.01); *B60W 50/16* (2013.01); *G06F 3/013* (2013.01); *G06V 20/597* (2022.01); *G06V 40/19* (2022.01); *H04N 13/128* (2018.05); *B60W 2040/0827* (2013.01); *B60W 2050/143* (2013.01); *B60W 2050/146* (2013.01); *B60W 2540/225* (2020.02); *B60W 2540/229* (2020.02)

(58) Field of Classification Search
CPC ................. B60W 40/08; B60W 50/16; B60W 2540/225; B60W 2540/229; B60W 2040/0827; B60W 2050/143; B60W 2050/146; H04N 13/128; G06F 3/013; G06K 9/00604; G06K 9/00845
See application file for complete search history.

(56) References Cited

U.S. PATENT DOCUMENTS 8,489,252 B2 * 7/2013 Inou .................... G06K 9/00845
701/1
2006/0055546 A1 3/2006 Farbos
(Continued)

FOREIGN PATENT DOCUMENTS

WO 2018006019 A1 1/2018

OTHER PUBLICATIONS

Swedish Search Report in the Appl.Nr. 2030120-6, dated Nov. 17, 2020.
(Continued)

*Primary Examiner* — Mohamed Barakat
(74) *Attorney, Agent, or Firm* — Christopher I. Moylan

(57) ABSTRACT

The invention is related to a method for driver alertness detection, The method comprises the steps of determining a vanishing point of a vehicle in motion; determining over time, by an eye tracking device, a set of gaze points of the driver of the vehicle; determining a gaze movement from the set of gaze points; and identifying an alertness of the driver, based on a direction of the gaze movement relative to the vanishing point being outward. Further, the invention is related to an eye tracking device for driver alertness detection, an alertness detection system, a computer program, and a computer-readable medium.

17 Claims, 10 Drawing Sheets

(56) References Cited

U.S. PATENT DOCUMENTS

| | | | |
|---|---|---|---|
| 2011/0169625 A1* | 7/2011 | James | B60W 30/095 340/439 |
| 2014/0139655 A1* | 5/2014 | Mimar | G08B 21/0476 340/575 |
| 2015/0116493 A1* | 4/2015 | Bala | G06K 9/00281 348/148 |
| 2016/0016515 A1* | 1/2016 | Mangin | B60R 1/04 340/425.5 |
| 2016/0272215 A1* | 9/2016 | Laine | B60W 50/14 |
| 2018/0229654 A1* | 8/2018 | Unver | G06V 20/597 |
| 2019/0236386 A1* | 8/2019 | Yu | A61B 3/145 |
| 2020/0057487 A1 | 2/2020 | Sicconi et al. | |
| 2020/0254876 A1* | 8/2020 | Cordell | G06V 20/56 |

OTHER PUBLICATIONS

Information on Grant of a Patent in the Appl.Nr. 2030120-6, dated Oct. 24, 2022.
European Search Report in the Appl.Nr. EP21166953, dated Aug. 19, 2021.

* cited by examiner

DRIVER ALERTNESS DETECTION METHOD, DEVICE AND SYSTEM

CROSS-REFERENCE TO RELATED APPLICATION

The present application claims benefit to Swedish patent application No. 2030120-6, filed Apr. 9, 2020, entitled "DRIVER ALERTNESS DETECTION METHOD, DEVICE AND SYSTEM", and is hereby incorporated by reference in its entirety.

TECHNICAL FIELD

The invention relates to driver alertness detection. More specifically to driver alertness detection using an eye tracking device.

BACKGROUND ART

Today driver drowsiness detection is an important safety feature in vehicles for avoiding accidents.

Several techniques for driver drowsiness detection exist today, such as steering pattern monitoring, vehicle position in lane monitoring or monitoring of the driver's eyes or face.

However, these techniques normally require some time to detect driver drowsiness or they are not compatible with some other features of a vehicle. For example, monitoring a driver by steering pattern only works as long the driver steers the vehicle actively instead of an automatic lane-keeping system. Or, vehicle positioning only works as long the driver steers the vehicle actively instead of an automatic lane-keeping system.

Thus, there is a need for an improved driver drowsiness detection.

SUMMARY

It is an object of the invention to at least partly overcome one or more of the above-identified limitations of the prior art. In particular, it is an object to provide an improved driver drowsiness or alertness detection.

According to a first aspect is a method for driver alertness detection, comprising: determining a vanishing point of a vehicle in motion; determining over time, by an eye tracking device, a set of gaze points of the driver of the vehicle; determining a gaze movement from the set of gaze points; and identifying an alertness of the driver, based on a direction, of the gaze movement relative to the vanishing point, being outward.

According to a second aspect is an eye tracking device for driver alertness detection, comprising: a processor configured to: determine a vanishing point of a vehicle in motion; determine over time a set of gaze points of the driver of the vehicle; determine a gaze movement from the set of gaze points; and identify an alertness of the driver, based on a direction of the gaze movement relative to the vanishing point being outward.

According to a third aspect is a driver alertness detection system, comprising: a vehicle; and an eye tracking device; the eye tracking device comprising a processor configured to: determine a vanishing point of the vehicle in motion; determine over time a set of gaze points of the driver of the vehicle;

determine a gaze movement from the set of gaze points; and identify an alertness of the driver, based on a direction of the gaze movement relative to the vanishing point being outward.

According to a fourth aspect is a computer program having instructions which when executed by a processor cause the processor to perform a driver alertness detection method comprising; determining a vanishing point of a vehicle in motion; determining over time a set of gaze points of the driver of the vehicle; determining a gaze movement from the set of gaze points; and identifying an alertness of the driver, based on a direction of the gaze movement relative to the vanishing point being outward.

According to a fifth aspect is a computer-readable medium having stored thereon a computer program for driver alertness detection, comprising determining a vanishing point of a vehicle in motion, determining over time a set of gaze points of the driver of the vehicle, determining a gaze movement from the set of gaze points, and identifying an alertness of the driver, based on a direction, of the gaze movement relative to the vanishing point, being outward.

Some examples of the disclosure provide for determining if a driver is looking outside of a vehicle and following an object, identifying the driver as alert.

Some examples of the disclosure provide for, where more gaze points are used in identifying alertness of a driver, the more accurate the identification of the alertness of the driver becomes.

Some examples of the disclosure provide for human physiology connected to eye movement and perception to identify an alert driver.

Some examples of the disclosure provide for a more robust and quicker detection of when a driver potentially starts to get inattentive, starts to get drowsy, or is drowsy and therefore could be warned and/or should not drive a vehicle anymore.

Some examples of the disclosure provide for identification of alertness of a driver based on a direction of a gaze movement being radially outward from a vanishing point.

Some examples of the disclosure provide for generation of different types of warnings.

Some examples of the disclosure provide for a sound being played that warns a driver.

Some examples of the disclosure provide for a visual warning that warns a driver.

Some examples of the disclosure provide for a haptic warning.

Some examples of the disclosure provide for a combination of haptic, visual and/or sound warnings.

Some examples of the disclosure provide for a warning being sent to a remote device inside and/or outside of a vehicle.

Some examples of the disclosure provide for a vehicle that will drive to a safe location without any input from a driver, if the driver has been identified as being inattentive.

Some examples of the disclosure provide for identification of an alertness of a driver being based on a convergence depth decreasing.

Some examples of the disclosure provide for correlating travel direction and/or speed of a vehicle with a gaze movement for identifying an alert driver.

Some examples of the disclosure provide for determining an alertness time.

Some examples of the disclosure provide for determining an alertness time and comparing the alertness time with an alertness threshold.

Some examples of the disclosure provide for a gaze point having less than a predetermined degree of deviation from a deviation line DL based on at least two other gaze points.

Some examples of the disclosure provide for an eye tracking device being divided into multiple units.

Some examples of the disclosure provide for a driver alertness detection method being executed partly in an eye tracking device and other processors or computing devices in and/or remote to a vehicle.

"In motion" in this application is to be understood to be a vehicle that is in physical motion, e.g. a car that is moving on a road. "In motion" should also be understood to include that a vehicle is simulated to be in motion, e.g. if a user is using a VR headset and the user is virtually driving the vehicle. Hence, "in motion" in this application should be understood to include both physical motion and simulated motion of the vehicle.

Still other objectives, features, aspects and advantages of the invention will appear from the following detailed description as well as from the drawings.

BRIEF DESCRIPTION OF THE DRAWINGS

Examples of the invention will now be described with reference to the accompanying schematic drawings, in which.

DETAILED DESCRIPTION

Figure 1A:
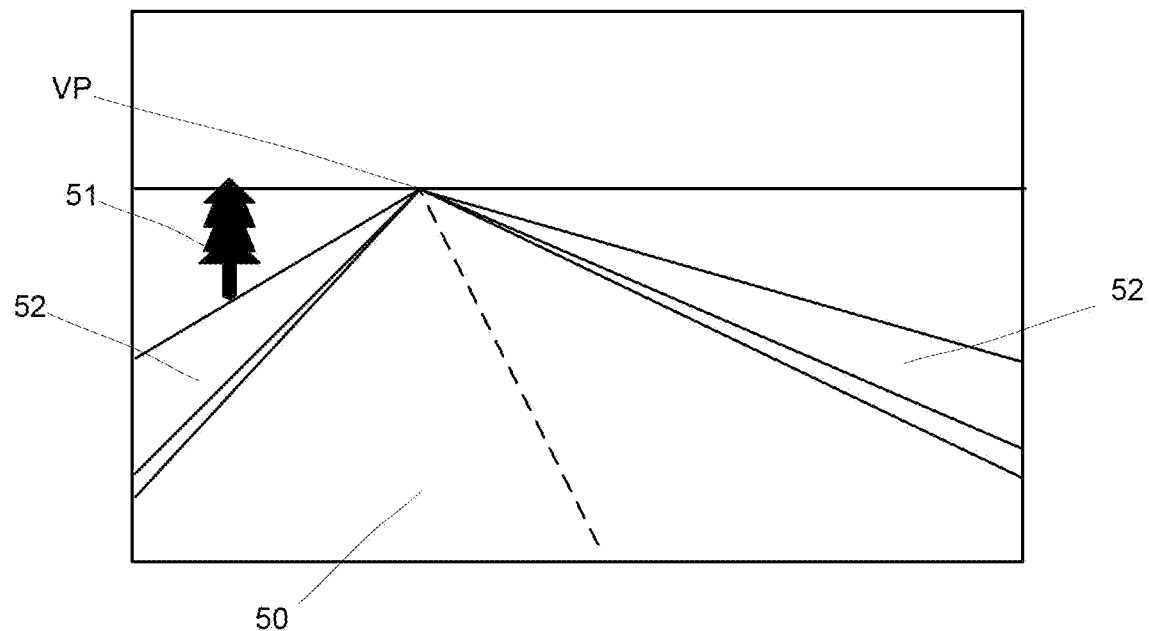
FIG. 1A illustrates a front view out from a vehicle, depicting a road on which the vehicle is moving, and a tree arranged next to a sidewalk of the road.
Figure 1B:
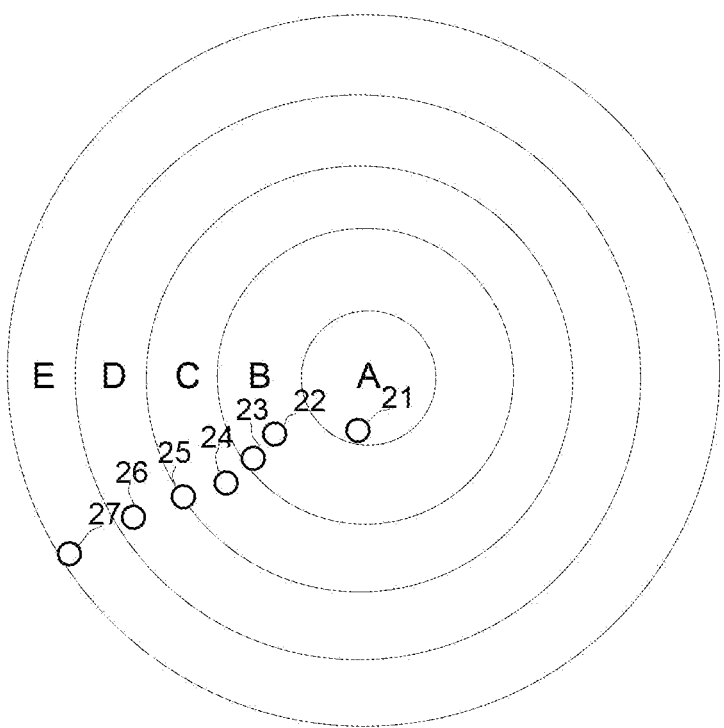
FIG. 1B illustrates a two-dimensional plot of a driver's gaze points when driving a vehicle in the situation of FIG. 1A.

FIG. 1A and FIG. 1B illustrate a driving situation of a vehicle and accompanying gaze points 21-27 of a driver's eyes related to the driving situation. This example will use seven gaze points, but other numbers of gaze points may be used to identify the gaze movement of the driver's eyes such as at least 3 gaze points, preferably 5 gaze points, more preferably 10 gaze points may be used for the gaze movement identification. In general, the more gaze points that is used for determining the gaze movement, the more accurate the identification of driver alertness becomes.

FIG. 1A illustrates a front view out from the vehicle depicting a road 50 on which the vehicle is being driven and a tree 51 is standing next to a sidewalk 52 of the road 50. The driver of the vehicle will tend to focus on objects outside of the vehicle if the driver is alert. In this example, the driver will try to follow the tree 51 when passing by and until the tree 51 is passed by the vehicle. The driver will then tend to look back at the vanishing point VP or horizon. The driver may also look at another object, such as at another tree standing by the road, instead of looking back at the vanishing point VP. This re-focus of the driver is normally repeated many times when driving. The vanishing point VP is considered to be a point towards which the vehicle in motion is moving. In this example, the vanishing point VP is at the horizon of the straight road 50.

FIG. 1B illustrates a two-dimensional plot of the driver's gaze points 21-27 when driving the vehicle in the above situation of FIG. 1A. The first detected gaze point 21, by the eye tracking device 300, in area A of the two-dimensional plot, shows that the driver starts by looking at the vanishing point VP in FIG. 1A. Gaze point 22 illustrates how the gaze of the driver is moved to the tree 51 and then follows the tree 51 while passing by, illustrated by gaze points 23-27.

Hence, based on gaze points 21-27, the driver is considered to be alert, as the gaze movement follows a direction outward from the vanishing point VP, represented by area A in the two-dimensional plot, to area E of the two-dimensional plot. Hence, the driver alertness detection method 10 is relying on human physiology connected to eye movement and perception. This allows, for example, a more robust and quicker detection of when the driver potentially starts to become inattentive, starts to get drowsy, or is drowsy and therefore could be warned and/or should not drive the vehicle anymore.

Thus, during forward driving, if the gaze of the driver is following a static object in front of the vehicle, a gaze movement outward from the vanishing point A; VP will follow. This allows for the driver alertness detection method 10 to detect if the driver is looking outside of the vehicle and following the object, and thus if the driver is alert.

Eye tracking is a well-established technique that can detect the gaze and/or convergence depth. The convergence depth may be defined as the distance from a position in the vicinity of the eyes to the position at which the gaze rays from the left and right eyes cross each other. Alternatively, the convergence depth may be defined as the distance from one of the eyes, or from a point between the eyes, to a depth at which the distance between gaze rays from the left and right eyes crosses is minimal. The first definition where the gaze rays from the left and right eyes cross each other is applicable when the gaze rays are defined in a 2D space. However, if the gaze rays are defined in a 3D space it is very unlikely that the gaze rays from the left and right eyes actually will cross each other. Thus, if the gaze rays are defined in a 3D space, the second definition is more applicable, i.e. a depth at which the distance between gaze rays from the left and right eyes crosses is minimal is of interest in determining the convergence depth. Several ways of identifying or calculating the gaze and/or convergence depth by the eye tracking device 300 exist but will not be discussed in detail in this application. The gaze of the eyes can be plotted in a two-dimensional plot as, for example, illustrated in FIG. 1B. Herein, the gaze is plotted as individual circles 21-27, representing the detected gaze of the driver at a fixed updating frequency of the eye tracking device 300. In this plot, a center area A is based on a central location of the gaze of the driver. The plot has further areas B, C, D and E arranged outward from the center area A, representing peripheral gaze. Other ways of plotting or mapping the detected gaze is also possible within the scope of this invention. The detection and/or determination of the gaze can be based on the left eye or the right eye. The gaze can also be detected and/or determined on a combination of the left and right eye.

Figure 2:
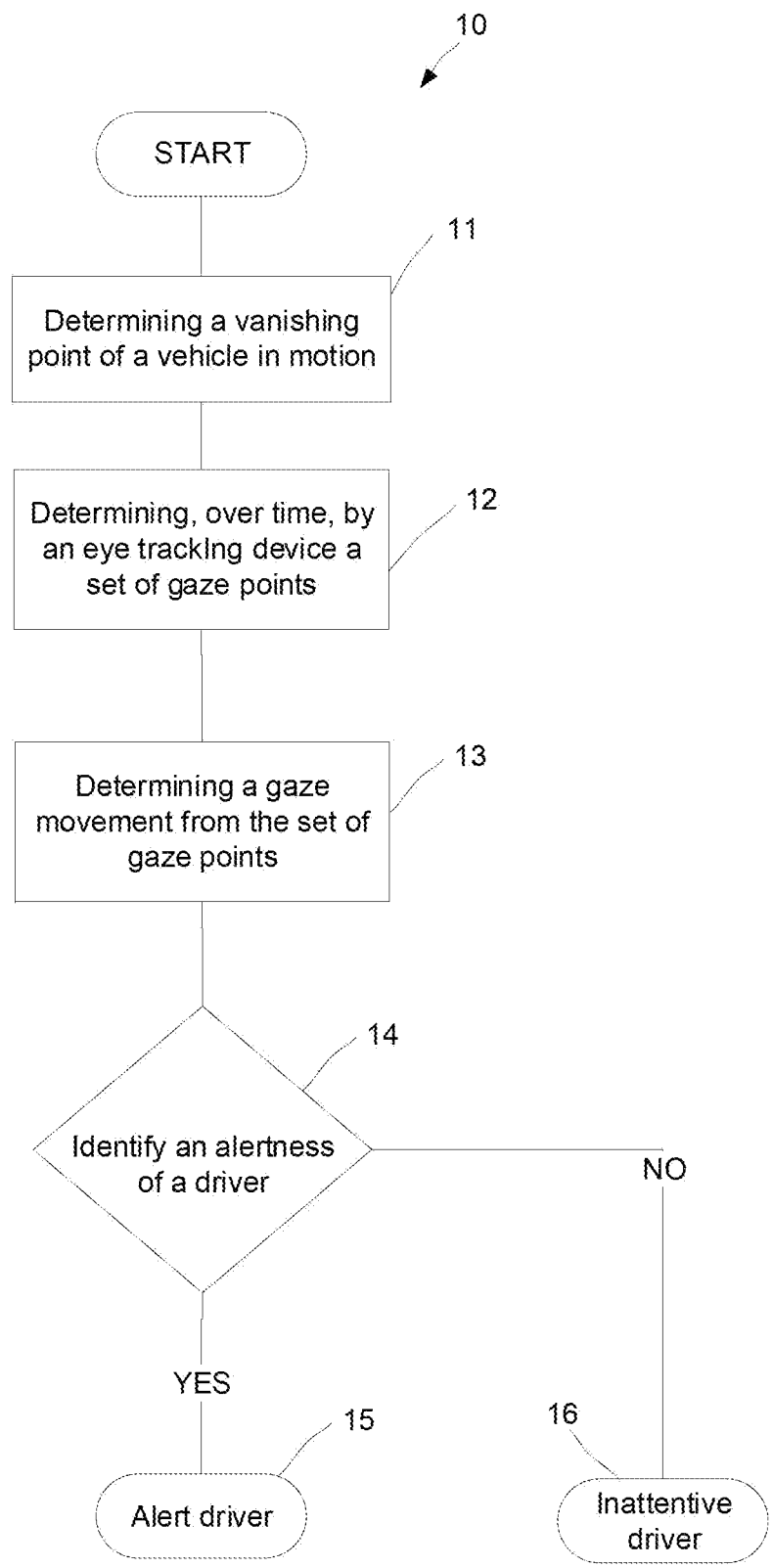
FIG. 2 illustrates a flow diagram of an example of a method for driver alertness detection.

Illustrated with reference to FIG. 2 is a flow diagram of an example of a method for driver alertness detection 10. The method for driver alertness detection 10 comprises determining 11 the vanishing point A; VP of the vehicle in motion. The method for driver alertness detection 10 further comprises determining 12 by the eye tracking device 300 a set of gaze points over time of the driver of the vehicle and determining 13 a gaze movement from the set of gaze points. Following this, the method includes identifying 14 an alertness of the driver, based on a direction of the gaze movement relative to the vanishing point A; VP being outward. The outcome of the identification 14 may then be that the driver is alert 15 or inattentive 16. The identification 14 of the alertness of the driver may in some examples be based on that the gaze movement relative to the vanishing point, being radially outward.

In relation to the method for driver alertness detection 10, the eye's or eyes' natural movement is important to understand. A driver will naturally want to anticipate potential collisions and hence focus their attention outside of the vehicle and in the general direction in which the vehicle is moving. Additionally, humans that are alert will naturally be drawn to objects outside of the moving vehicle, lock on to the objects and try to follow the objects as the objects pass by. When following the objects, the eyes will present a movement that is considered to be smooth, also known as smooth pursuit. In contrast, when the eyes are trying to re-focus to a new object or a quickly moving object, the eyes will present a movement which is considered to be of a more 'catch-up' type movement, known as saccadic movement. Saccades are a quick (20-200 ms), simultaneous movement of both eyes between two or more phases of fixation in the same direction.

Figure 3:
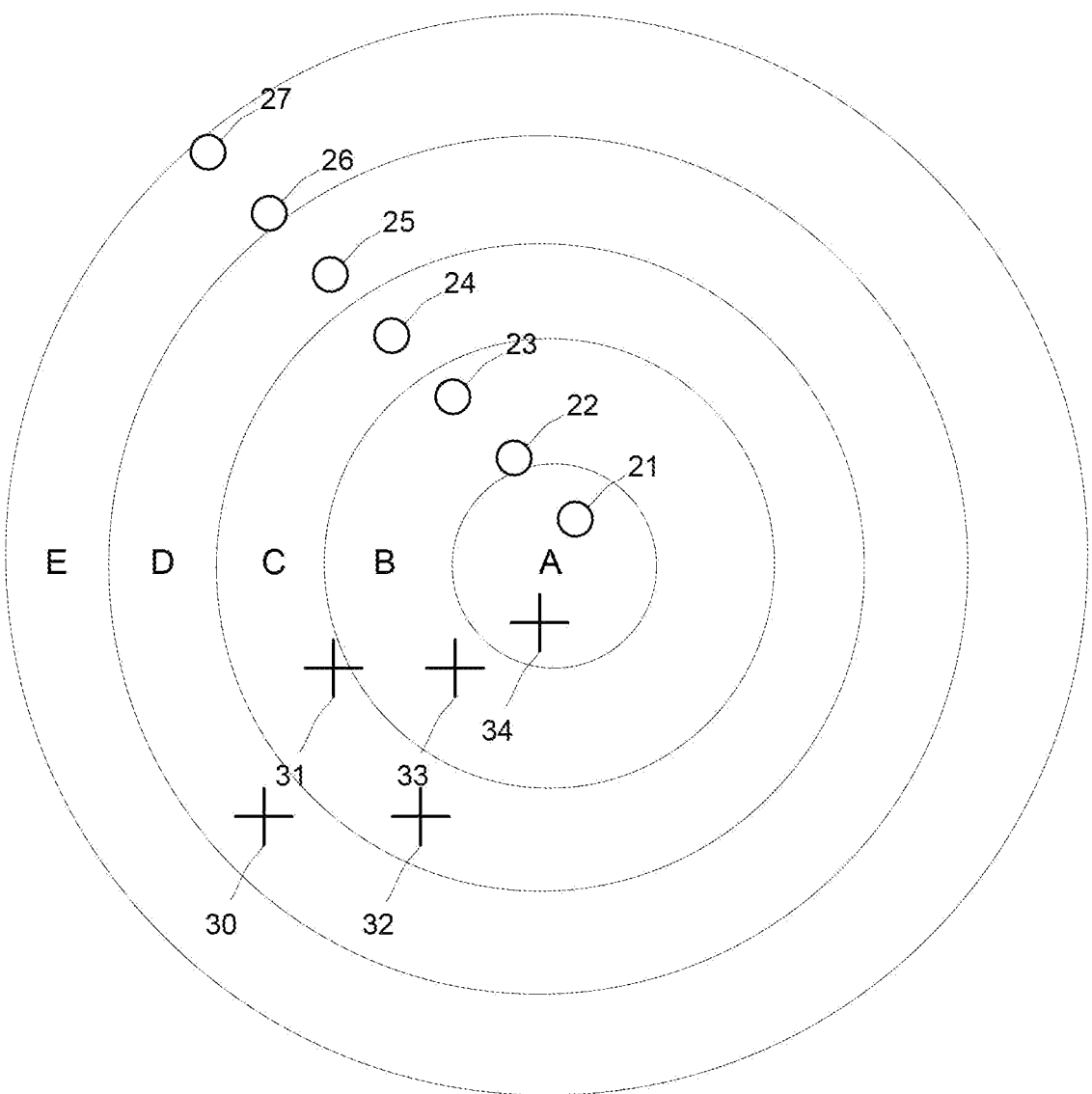
FIG. 3 illustrates another two-dimensional plot of gaze points related to a similar situation as above in FIG. 1A but which also illustrates gaze points belonging to a driver identified as being inattentive.

FIG. 3 illustrates another example of a two-dimensional plot of gaze points 21-27 related to a similar situation as above in FIG. 1A but FIG. 3 also illustrates gaze points 30-34 belonging to a driver identified 14 as being inattentive. As discussed above, gaze points 21-27 are determined 13 as having the outward gaze movement from the vanishing point A; VP and thus the driver is identified 14 as being alert and following an object outside of the vehicle. Gaze points 30-34 are randomly distributed, which is indicative of the driver randomly looking outside of the vehicle and not following any specific object. Hence, based on gaze points 30-34 the gaze movement is determined 13 to be inward towards the vanishing point A; VP and the driver will therefore be identified 14 to be inattentive.

The method for driver alertness detection 10 may also include generation of different types of warnings to the driver based on if the driver is identified 14 as alert or inattentive. In an example, a sound is played that warns the driver. Another warning could be to display a visual warning that warns the driver by, for example, activating a light that turns on and off or an icon on a display screen. The warning may also be a haptic warning such as the steering wheel vibrating or any other haptic feedback in the vehicle for the driver. There can also be a combination of the above haptic, visual and/or sound warnings.

In other examples, the warning may be sent to a remote device inside and/or outside of the vehicle, such as a server, and/or an operator over a communications network. This may in turn prompt the remote device and/or operator to communicate with the vehicle and/or driver to secure safe driving of the vehicle. The communications network may be a wireless communications network and/or a wired communications network. It may also be that the vehicle will drive to a safe location without any input from the driver if the driver has been identified 14 to be inattentive based on the driver alertness detection method 10.

Figure 4:
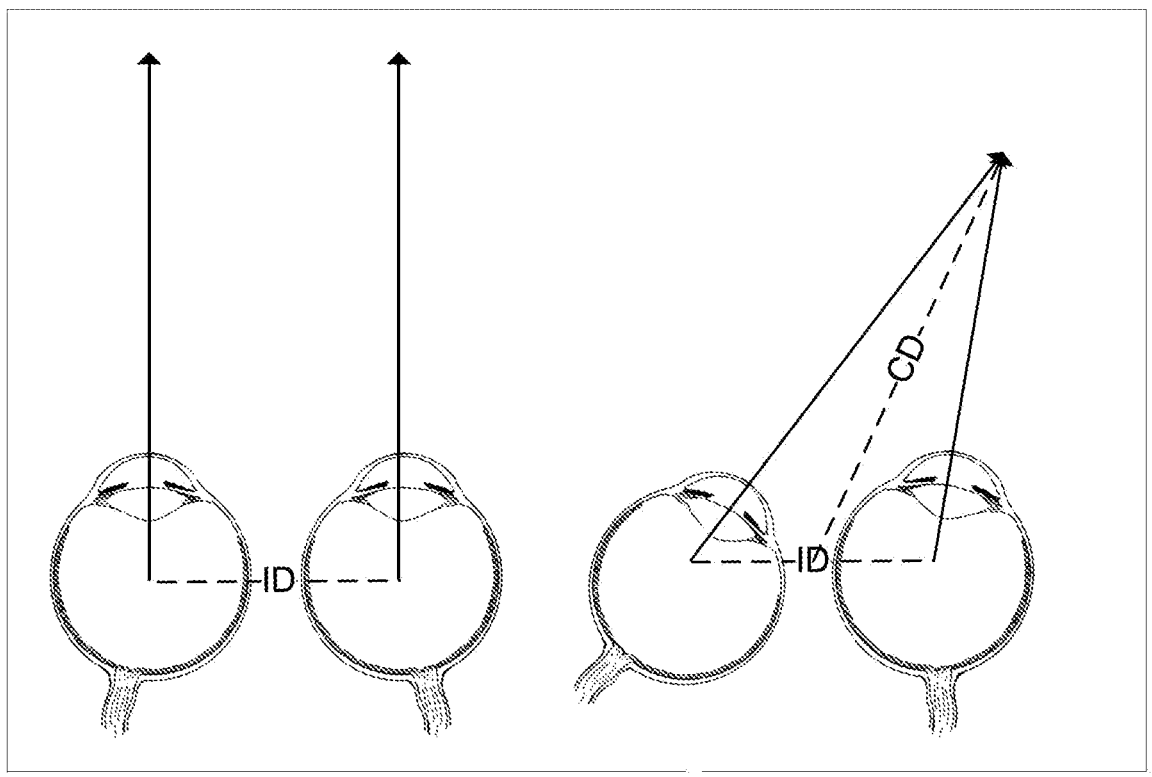
FIG. 4 illustrates gaze rays from the left and right eyes of a driver looking straight forward and gaze rays from the left and right eye of the driver when locked on to an object.

Illustrated in FIG. 4 is two example orientations of the pair of eyes of the driver. The left pair of eyes are indicative of the driver when looking straight forward out from the vehicle, for example, at the vanishing point VP. When the driver is looking straight forward, a convergence depth will be at infinity or distant, illustrated by the gaze rays from the left and right eyes not crossing each other, but rather the gaze rays being parallel to each other. The gaze of the left and right eye will also be separated from each other, illustrated by a distance ID between the lines of each eye.

Illustrated by the right pair of eyes is, for example, a situation when the driver will move the eyes to the side of the vehicle so that the driver can track an object, such as a tree, by focusing on the tree when passing by with the vehicle. The focus of the driver on the tree will change the convergence depth as the tree gets closer when passing by with the vehicle. This is illustrated by the right pair of eyes in FIG. 4, wherein respective gaze rays of each eye converge to the same point resulting in the convergence depth CD. There are several techniques to estimate the convergence depth CD based on, for example, interocular distance, interpupillary distance, gaze origin and/or a gaze ray.

In an example, the identification 14 of the alertness is based on a decrease in a convergence depth CD of the driver. By estimating the driver's convergence depth CD, it is possible to detect if the driver is following an object that is passing by the vehicle. As discussed above, the convergence depth CD represents at what depth the gaze rays from the left and right eye, respectively, converge. Alternatively, if the left and right gaze rays are compared in 3D, the convergence depth CD represents at what depth the distance from the gaze rays of the left and right eye, is minimized.

In an example, the convergence depth CD is compared to distances of known vehicle objects, such as the windscreen, the mirrors or other objects in or at the vehicle. By comparing the convergence depth CD to the different distances of known vehicle objects, the identification 14 of alertness of the driver can be further improved since if the driver is looking at any one of these known vehicle objects, the driver is considered to be alert. For example, the driver may be looking at a vehicle in front of the own vehicle, driving in the same direction. Alternatively, the driver may be looking at the rearview mirror or any of the sideview mirrors. The distance of the known vehicle object and the convergence depth CD could in some examples have a difference of 10, 20 or 30% and still be considered to have the same distance.

Figure 5:
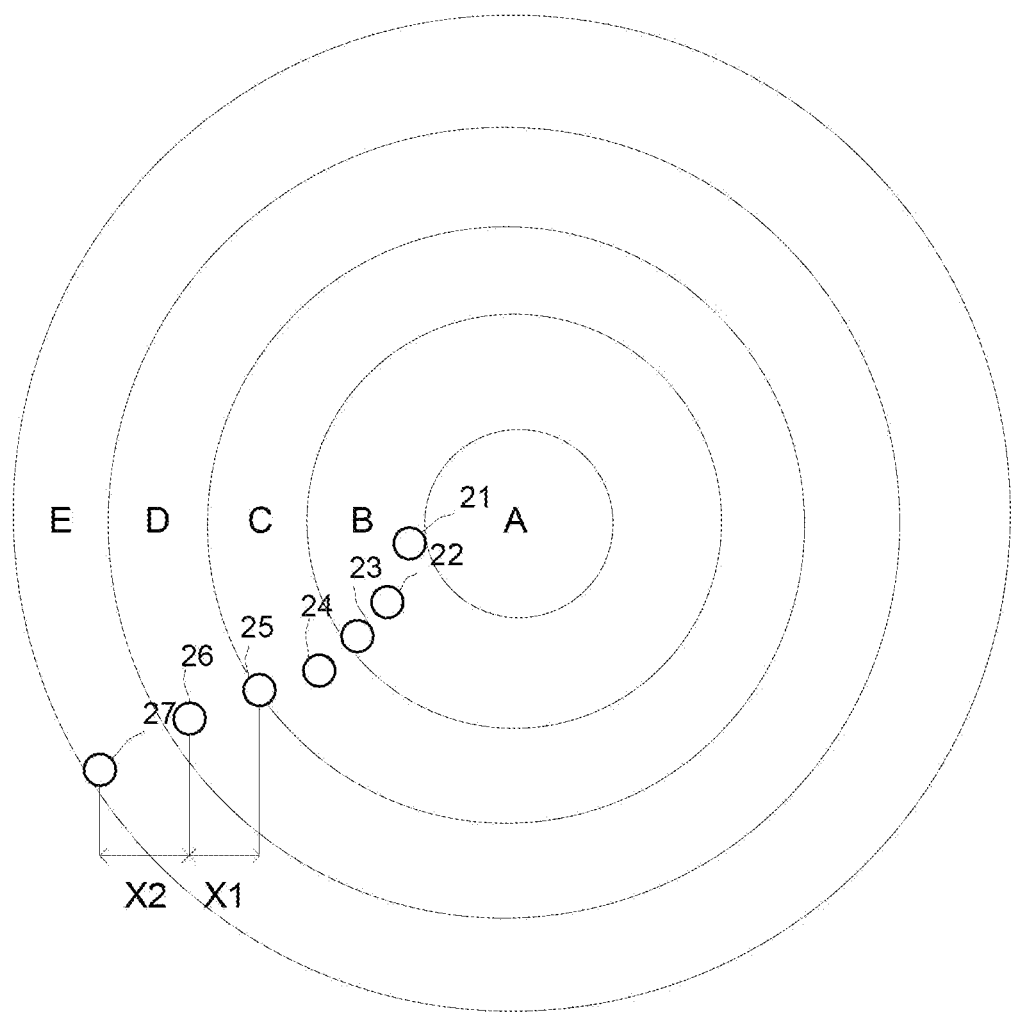
FIG. 5 illustrates an increase in distances between two gaze point pairs.

The identification 14 may be based on an increase in spacing between two gaze point pairs as for example illustrated in FIG. 5. The eye tracking device 300 normally has a set sampling frequency when detecting the gaze of the driver. The gaze of the driver could then be detected as gaze points 21-27, illustrated in FIG. 5, when following an object outside of the vehicle. FIG. 5 illustrates a first distance X1 between a first gaze point pair 25 and 26, and a second distance X2 between a second gaze point pair 26 and 27. The distance X1 is smaller than distance X2 and since the sampling frequency of the eye tracking device 300 is set, the increase in distance from X1 to X2 means that the movement of the gaze of the driver accelerates. The acceleration of the driver's gaze could be due to the driver moving the eyes, head, and/or the vehicle accelerating.

In some examples, the vehicle's acceleration is used as an input to determine if the gaze movement, relative to the vanishing point, correlates to the acceleration and/or deceleration of the vehicle. For example, the vehicle's acceleration is compared to a distance between two gaze points, such as 25 and 26, to see if they correlate. The vehicle's acceleration may also be used to predict a distance to a new, not yet detected, gaze point and verify if the newly detected gaze point is at the predicted distance. The identification 14 can be carried out on three gaze points 25-27, making up two gaze point pairs 25-26 and 26-27 as discussed above in relation to FIG. 5, but more gaze points may also be used for making up more gaze point pairs when correlating the vehicles travel information for identifying 14 if the driver is alert.

Figure 6:
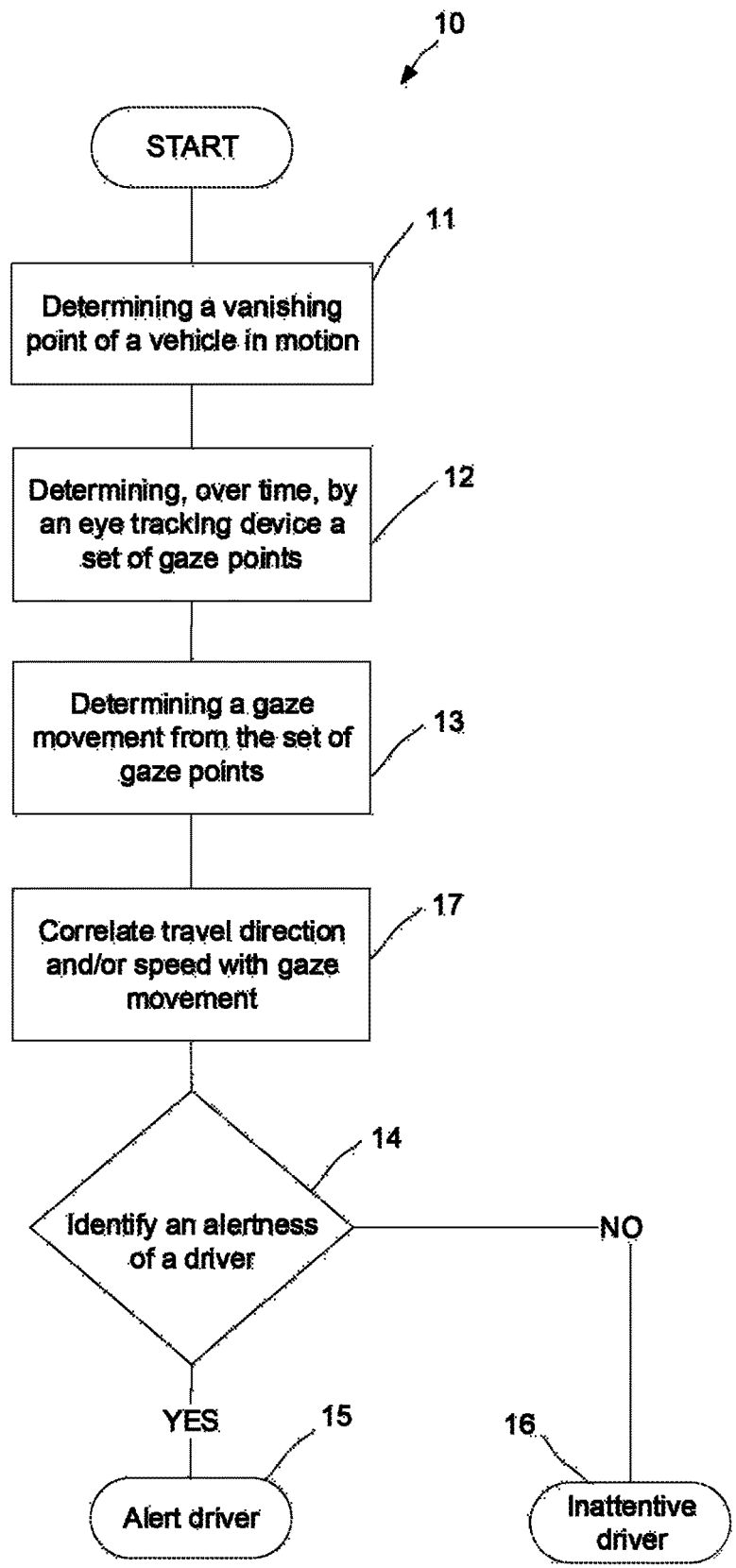
FIG. 6 illustrates a flow diagram of an example of a method for driver alertness detection that correlate travel direction and/or speed of a vehicle with a gaze movement of a driver.

Illustrated in FIG. 6 is an example of the method for driver alertness detection 10 that correlates 17 travel direction and/or speed of the vehicle with the determined 13 gaze movement. The travel direction and/or speed of the vehicle may be determined by use of a signal and/or data comprising vehicle travel information and/or exterior vehicle information. This allows for even further improved identification 14 of the driver being alert 15 or being inattentive 16.

Vehicle travel information and/or exterior vehicle information can include many things such as a speed, direction, steering wheel position, a yaw of the vehicle, a tilt of the vehicle, a roll of the vehicle, information of a simultaneous localization and mapping of the vehicle (SLAM), GPS information, optical information, one-dimensional optical information, two-dimensional optical information, LiDAR information, two-dimensional sonar information and/or three-dimensional sonar information. This information can be used singularly and/or in combination to determine travel direction of the vehicle and/or speed of the vehicle.

For example, accelerometer information comprising yaw, tilt and/or roll may be used to determine a more accurate travel direction of the vehicle and/or the vanishing point VP of the vehicle. In some examples, SLAM information is used to determine the speed, direction of the vehicle and/or correlate gaze points with other vehicles located around the vehicle.

The driver alertness detection method 10 may in some examples determine an alertness time. The alertness time may be a calculated as a time since the last identification 14 of the alertness of the driver. If the alertness time exceeds an alertness time threshold, the driver is warned as discussed above. By calculating the alertness time between at least two identifications 14, it is possible to compare the alertness time with the alertness time threshold and further identify 14 if the driver is alert 15.

The alertness threshold may be selected in a variety of ways such as a static alertness time threshold and/or a dynamic alertness threshold. The alertness time threshold could be based on the prerequisite from a driving safety perspective of allowing the driver to perform other tasks in the vehicle that produces gaze points and gaze movement that would, based on the discussion above, be identified 14 as an inattentive driver 16. These gaze points and gaze movements, when combined with the calculated alertness time threshold, would therefore not by default mean that the driver is identified 14 as inattentive 16 but instead as alert 15.

Figure 10:
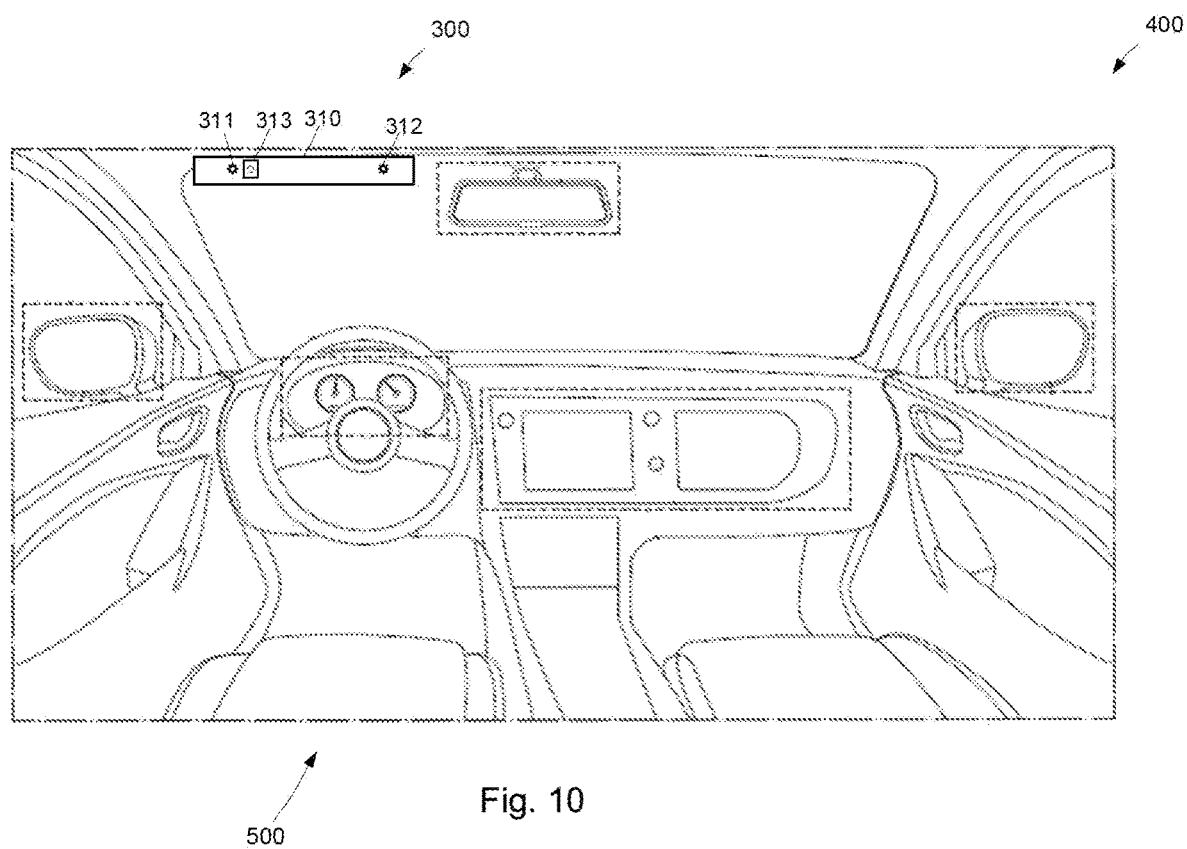
FIG. 10 Illustrates a driver alertness detection system comprising a vehicle and an eye tracking device for driver alertness detection.

For example, the driver may be looking at various known vehicle objects inside the vehicle such as at the dashboard or mirrors, for a few seconds, illustrated in FIG. 10. The alertness time threshold may then be selected to be static and set to not more than 3-5 seconds allowing time for the driver to look at, for example, the mirrors.

The driver may also focus on a new object, which results in the eyes making the saccade movement discussed above. The gaze points and gaze movement may thus not be determined to be in the outward direction from the vanishing point A; VP. Thus, when refocusing on the new object the alertness time threshold may be selected to be between 0.5 seconds and 5 seconds, during which the driver will not be warned.

Hence, the alertness time threshold could be set static to a few seconds such as 2-10 seconds, or more preferably 3-6 seconds, to account for the above examples and during which the driver is not warned although no gaze movement outward from the vanishing point A is determined.

In other examples the alertness time threshold is dynamically selected based on, for example, the speed of the vehicle. This dynamic alertness threshold would allow the driver to be more inattentive when driving at low speeds than compared to when driving at high speeds and the driver is allowed less or even almost no time at all to have any gaze movement that isn't identified 14 to be indicative of an alert driver 15.

Figure 7:
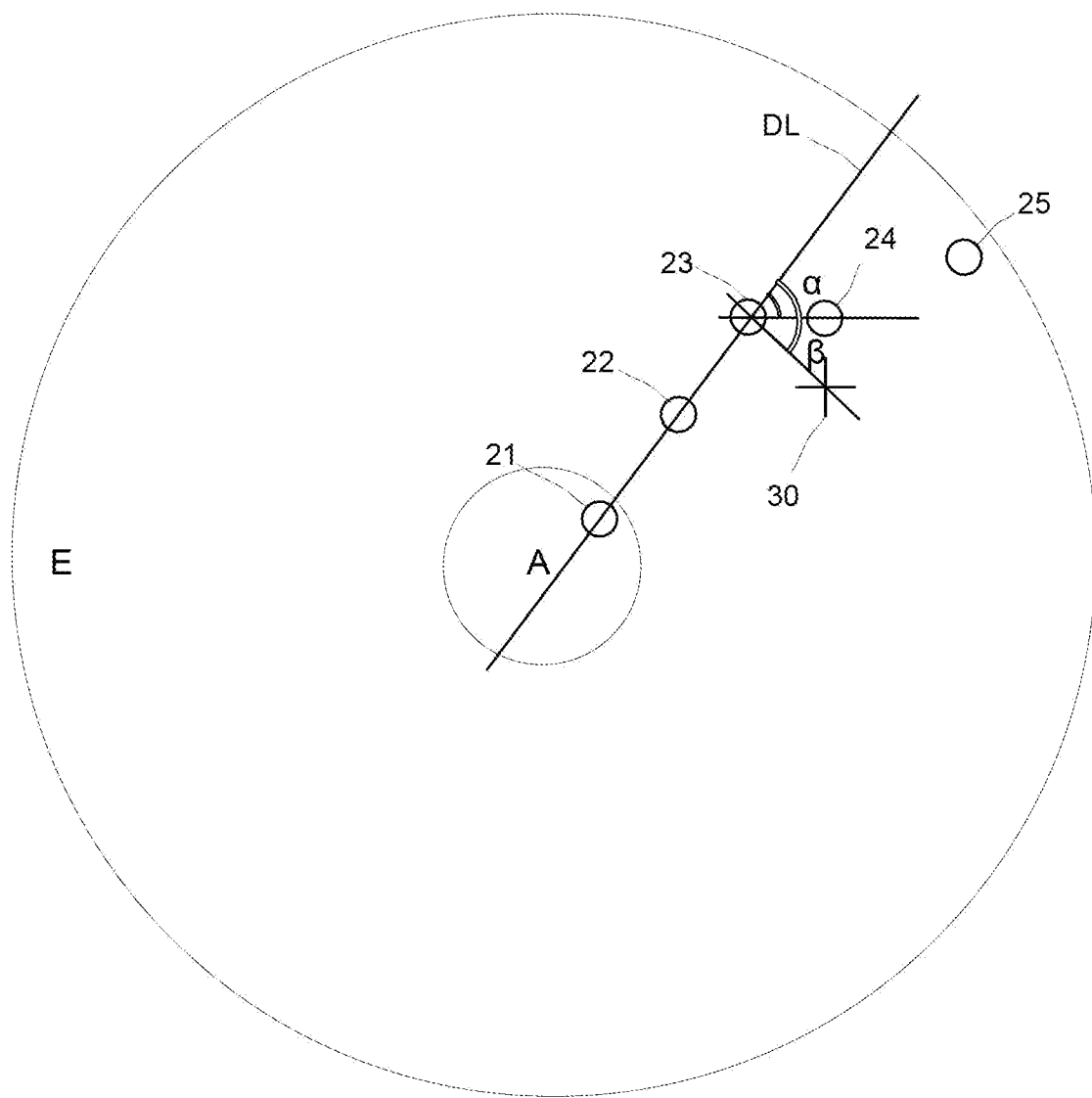
FIG. 7 illustrates a two-dimensional plot having a gaze point that deviates less than and a gaze point that deviates more than a predetermined degree of deviation from a deviation line, the deviation line DL being based on at least two other gaze points.

Illustrated in FIG. 7 is an example of another two-dimensional plot of a non-linear gaze movement. The two-dimensional plot has a gaze point 24 that deviates less and a gaze point 30 that deviates more than a predetermined degree of deviation from a deviation line DL. In one example, the non-linear gaze movement is caused by the vanishing point VP; A moving during the tracking of an object. The vanishing point may be moving due to the vehicle turning or having turned during the tracking or the road being bumpy. In another example, the non-linear gaze movement is caused by precision error of the eye tracking device 300. Thus, there are many examples of why a slightly irregular gaze movement should be accounted for.

In FIG. 7 the deviation line DL is based on three gaze points 21-23. The gaze point 24 is in this example not identified on the deviation line DL but instead at an angle $\alpha$, 50 degrees separated from the deviation line DL, using the previous gaze point 23 as the starting point. Also illustrated is the other gaze point 30 that is neither identified on the deviation line DL but instead at an angle $\beta$, 100 degrees separated from the deviation line DL, using the previous gaze point 23 as the starting point. In this example, the predetermined degree of deviation from the deviation line DL, using the previous gaze point 23 as the starting point, has been selected to be at most 50 degrees in order to identify 14 the determined 13 gaze movement belonging to an alert driver. This means that the determined gaze movement based on gaze points 21-25 will be identified 14 as belonging to an alert driver 15 and the determined 13 gaze movement based on gaze points 21-23 and gaze point 30 will be identified 14 as belonging to an inattentive driver 16.

The deviation line DL can be calculated and based on linear regression or similar well-known methods and will therefore not be further discussed. The degree of deviation may be selected to be within a fixed range, as in the above example, or it may be selected as a being within a dynamic range. The selection, static or dynamic, may be based on vehicle travel information, statistics, and/or machine learning. The degree of deviation, using the previous gaze point 23 as the starting point, may be selected to be within the fixed range 1-60 degrees, preferably 10-50 degrees and more preferably 15-30 degrees.

As shown, the deviation line is based on linear regression taking into account all of the previous gaze points 21-23. As each additional gaze point is added and determined to be within the fixed or dynamic range, the deviation line DL may be updated to take into account additional gaze points. The deviation line DL may therefore be based on a the total amount of gaze points in any given sequence, i.e. from the vanishing point VP; A, or may be determined from a rolling sequence of gaze points, e.g. three gaze points, or five points, or any other number of gaze points.

Further, the predetermined degree of deviation from the deviation line DL, could be determined using another point of origin instead of the previous gaze point 23. In another example, the point of origin is defined as the first gaze point of the smooth pursuit, i.e. gaze point 21. If using the first gaze point 21 as origin for the angle, gaze point 24 deviates about 15 degrees from the deviation line DL, while gaze point 30 deviates about 25 degrees from the deviation line DL. In this example, using the first gaze point 21 as origin for the angle, the predetermined deviation from the deviation line DL, considered to be within the limit for identification of an alert driver, may be defined as any value between 1 degree and 50 degrees. Yet further, the point of origin may be defined as the vanishing point A. If using the vanishing point A as origin for the angle, gaze point 24 deviates about 13 degrees from the deviation line DL, while gaze point 30 deviates about 22 degrees from the deviation line DL. Also, in this further example, using the vanishing point A as origin for the angle, the predetermined deviation from the deviation line DL, considered to be within the limit for identification of an alert driver, may be defined as any value between 1 degree and 50 degrees.

Figure 8:
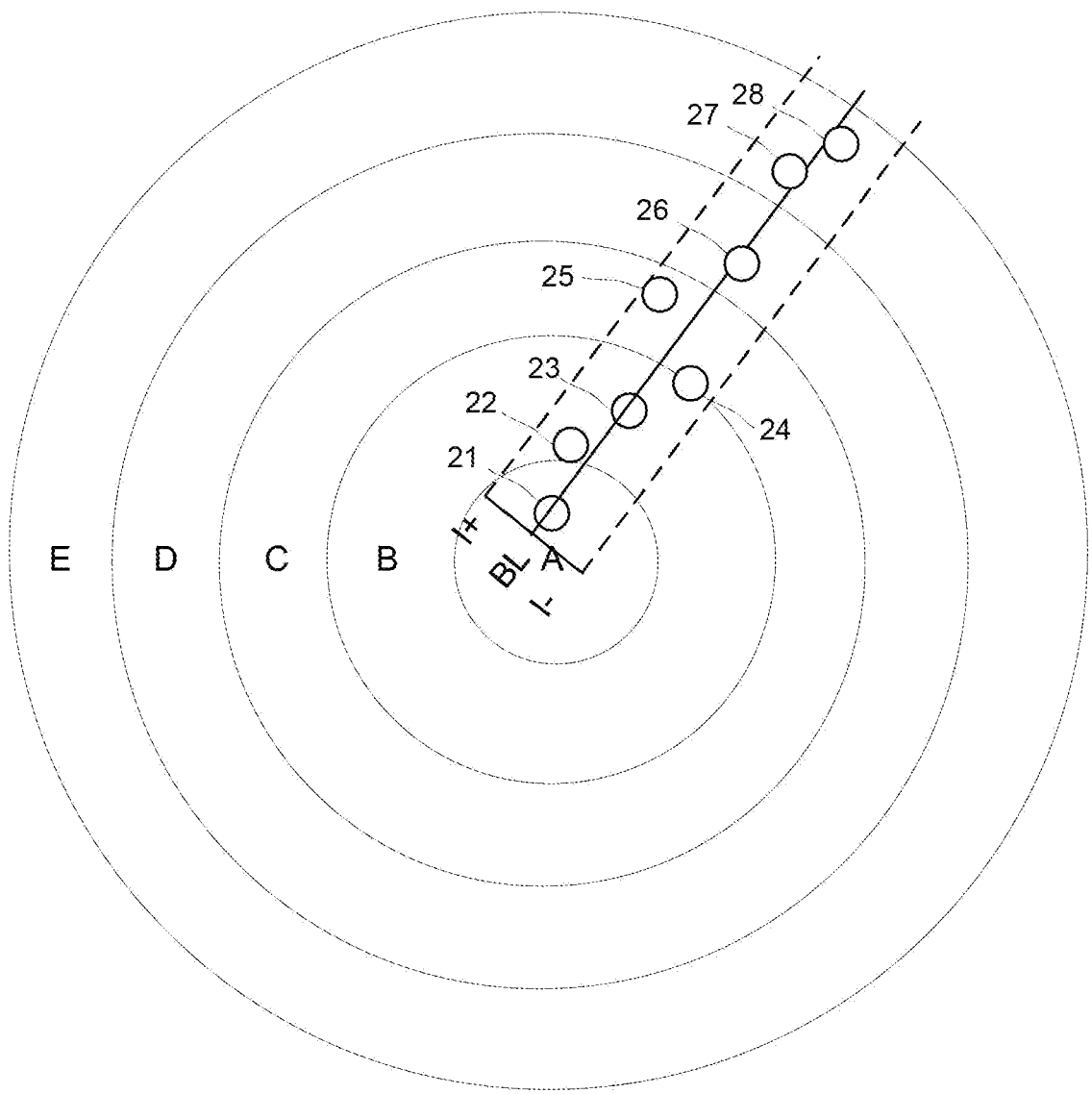
FIG. 8 illustrates an example of a straight line having gaze points which are somewhat scattered around a line BL and within a confidence interval I+ and I−.

Further, throughout this disclosure the gaze points and the determined 13 gaze movement have been simplified and mainly discussed in relation to following a substantially straight line. To further clarify the understanding of what can be considered to be a straight line, FIG. 8 illustrates gaze points 21-28 representative of normal eye movement when following an object. FIG. 8 illustrates gaze points 21-28 which are somewhat scattered around a base line BL, which can be a regression line and within a confidence interval 1+ and I−.

The eye movements and/or the detection of the eye movements are for some people and/or situations not linear and will thus exhibit some variation. Depending on an accepted variation of the gaze points the confidence interval 1+ and I− may be selected to be ±30%, preferably ±20% or more preferably ±10%. The confidence interval 1+ and I− may also be dynamically adapted based on vehicle travel information and/or statistics.

Figure 9:
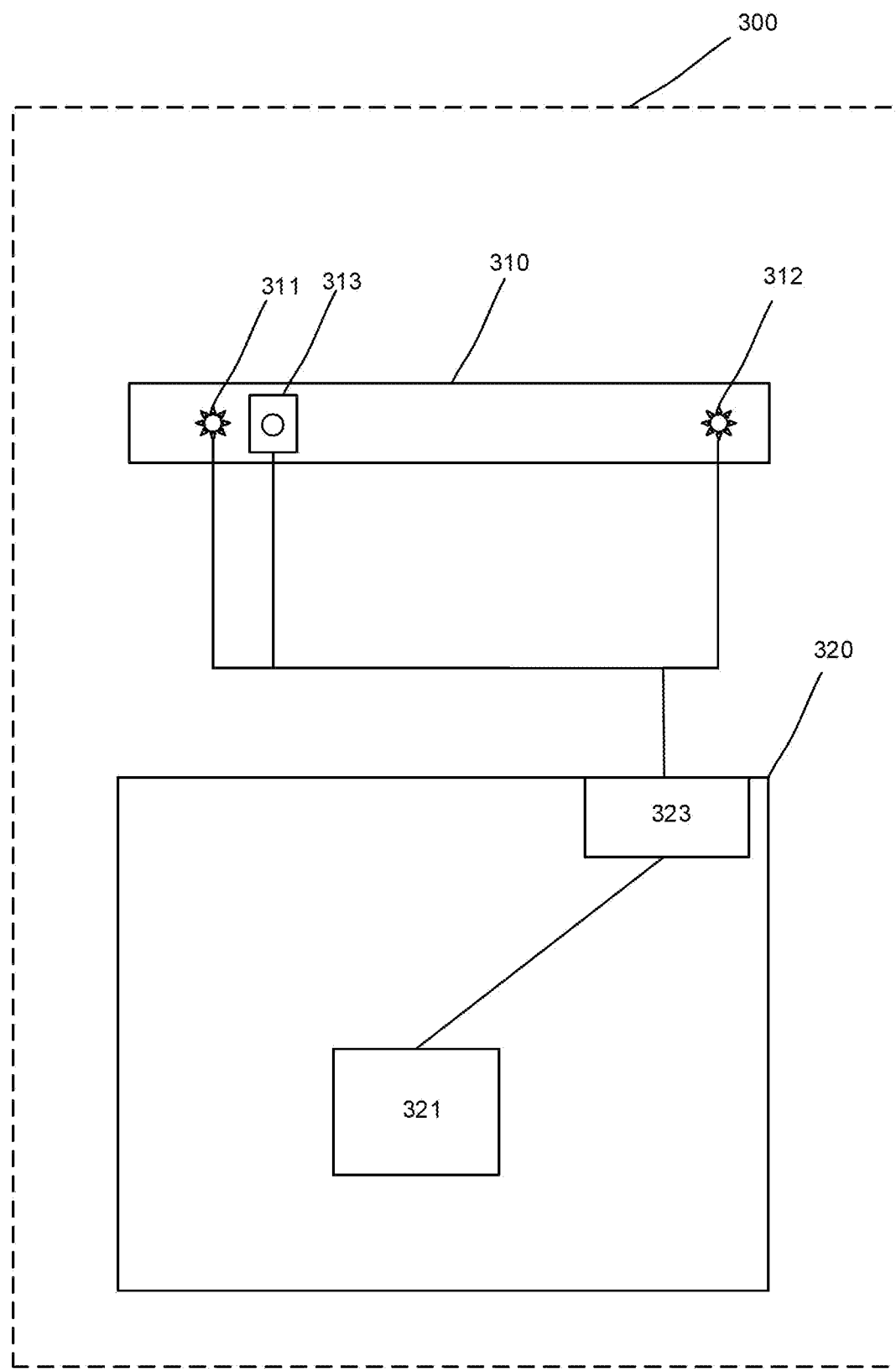
FIG. 9 is a schematic diagram of an eye tracking device for driver alertness detection.

Illustrated in FIG. 9 is an example of an eye tracking device 300 for driver alertness detection. In this example, the eye tracking device 300 is illustrated as a single unit comprising a remote eye tracker 310 and a controller 320. However, the eye tracking device 300 may of course be divided into multiple units separated from each other or sub-units, such as the remote eye tracker 310 may comprise illuminators 311, 312 and an optical sensor 313. The controller 320 could then be located elsewhere and the controller 320 may at least comprise a processor 321 and a remote tracker interface 323. The processor 321 is in some examples configured to execute the alertness driver detection method 10 discussed above.

The eye tracking device 300 may be arranged in various places depending on the desired use. For instance, if the eye tracking device 300 is arranged in the vehicle, the eye tracking device 300 could be placed at the mirror or at the sun shield as illustrated in FIG. 10. The eye tracking device 300 could also be placed around the dashboard or at any location in or around the vehicle as long as the eye tracking device 300 can detect the eyes of the driver during normal driving conditions. The eye tracking device 300 can also be integrated into a head-mounted VR headset, or similar for driver alertness detection 10 when simulating driving or movement of the vehicle.

Illustrated in FIG. 10 is a driver alertness detection system 400 comprising a vehicle 500, only parts of the vehicle is illustrated, and the remote eye tracker 310 of the eye tracking device 300. The vehicle may be a land vehicle such as car or truck, a water vehicle such as a boat, an air vehicle such as an airplane or a space vehicle such as a rocket or space shuttle.

As discussed above, the driver alertness detection method 10 may be executed in the eye tracking device 300, or the driver alertness detection method 10 may distributed between the eye tracking device 300 and other processors or computing devices in and/or remote to the vehicle 500. In an example, a computer program having instructions which when executed by a processor cause the processor to perform the driver alertness detection method 10. A computer-readable medium may also be used having stored thereon a computer program for driver alertness detection.

In the above discussed examples, and for simplicity, the vanishing point area A has been used as the starting point for the determined gaze points and then following for the determined gaze movement. However, the determined gaze points may be determined and start in, for example, area B or C of the two-dimensional plot and then further gaze points could be determined to be arranged in area C, D or E, outward from the vanishing point area A.

Throughout this description the examples have been focused on the driver driving the vehicle but the driver alertness detection method 10 is equally applicable to other situations where a user is not driving a vehicle. For example, the alertness detection method 10 can be used for an autonomous vehicle and for securing that the driver is still paying attention if ever the autonomous vehicle is in need of assistance.

Generally, in the context of this application the term "communication network" refers to a wired and/or wireless network over which information can be sent. The wired network may be based on ethernet and/or optical technologies. The wireless network may be based on 3G-5G, WIFI and/or Bluetooth.

Generally, in the context of this application the term "processor or computer" refers to any electronic device comprising a processor, such as a general-purpose central processing unit (CPU), a specific purpose processor such as field-programmable gate array or a microcontroller. A processor or computer is capable of receiving data (an input), of performing a sequence of predetermined operations thereupon, and of producing thereby a result in the form of information or signals (an output). Depending on context, the term "computer" will mean either a processor in particular or can refer more generally to a processor in association with an assemblage of interrelated elements contained within a single case or housing.

The systems and methods described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

From the description above follows that, although various examples of the invention have been described and shown, the invention is not restricted thereto, but may also be embodied in other ways within the scope of the subject-matter defined in the following claims.

The invention claimed is:

1. A method for driver alertness detection, comprising:
   determining a vanishing point of a vehicle in motion, wherein the vanishing point is a point towards which the vehicle is moving;
   determining over time, by an eye tracking device, a set of gaze points of the driver of the vehicle;
   determining a direction of movement of gaze from the set of gaze points; and
   identifying an increased level of alertness of the driver, based on the direction of movement of gaze being away and outward from the vanishing point, wherein the identifying of the alertness of the driver is further based on whether a distance between two gaze point pairs, in an outward direction from the vanishing point, is increasing.

2. The method for driver alertness detection according to claim 1, wherein the identifying of the alertness of the driver is based on the direction of movement of gaze relative to the vanishing point being radially outward.

3. The method for driver alertness detection according to claim 1, wherein the identifying of the alertness of the driver is based on determining if a convergence depth decreases.

4. The method for driver alertness detection according to claim 1, wherein the identifying of the alertness of the driver is based on if the movement of gaze correlates to a travel direction and/or speed of the vehicle.

5. The method for driver alertness detection according to claim 1, wherein a travel direction and/or speed of the vehicle is determined by use of a signal and/or data comprising vehicle travel information and/or exterior vehicle information.

6. The method for driver alertness detection according to claim 1, wherein the vanishing point of the vehicle is determined by use of a signal and/or data comprising vehicle travel information and/or exterior vehicle information.

7. The method for driver alertness detection according to claim 1, further comprising:
   determining an alertness time, the alertness time being calculated as a time since the last identification of alertness of the driver; and
   warning the driver if the alertness time exceeds an alertness time threshold.

8. The method for driver alertness detection according to claim 1, wherein the identifying of the alertness is based on at least 3 gaze points.

9. The method for driver alertness detection according to claim 1, further comprising:
   determining if a gaze point deviates less than a predetermined degree of deviation from a deviation line based on at least two other gaze points.

10. The method for driver alertness detection according to claim 1, further comprising:
    determining if the movement of gaze follows a straight line.

11. The method for driver alertness detection according to claim 1, further comprising:
    determining if the movement of gaze correlates to a travel direction and/or a speed of the vehicle.

12. The method for driver alertness detection according to claim 1, wherein the identifying of the alertness is based on at least 5 gaze points.

13. The method for driver alertness detection according to claim 1, wherein the identifying of the alertness is based on at least 10 gaze points.

14. An eye tracking device for driver alertness detection, comprising:
    a processor configured to:
    determine a vanishing point of a vehicle in motion, wherein the vanishing point is a point towards which the vehicle is moving;
    determine over time a set of gaze points of the driver of the vehicle;
    determine a direction of movement of gaze from the set of gaze points; and
    identify an increased level of alertness of the driver, based on the direction of movement of gaze being away and outward from the vanishing point, wherein the identifying of the alertness of the driver is further based on if a distance between two gaze point pairs, in an outward direction from the vanishing point, is increasing.

15. A driver alertness detection system, comprising:
    a vehicle; and
    an eye tracking device;
    the eye tracking device comprising a processor configured to:
    determine a vanishing point of the vehicle in motion, wherein the vanishing point is a point towards which the vehicle is moving;
    determine over time a set of gaze points of the driver of the vehicle;
    determine a direction of movement of gaze from the set of gaze points; and
    identify an increased level of alertness of the driver, based on the direction movement of gaze being away and outward from the vanishing point, wherein the identifying of the alertness of the driver is further based on if a distance between two gaze point pairs, in an outward direction from the vanishing point, is increasing.

16. The driver alertness detection system according to claim 15, wherein the eye tracking device is a remote eye tracker arranged in the vehicle or the eye tracking device is incorporated in a head-mounted device on the driver.

17. A non-transitory computer-readable medium having stored thereon a computer program for driver alertness detection, comprising:
    determining a vanishing point of a vehicle in motion, wherein the vanishing point is a point towards which the vehicle is moving,
    determining over time a set of gaze points of the driver of the vehicle,
    determining a direction of movement of gaze from the set of gaze points, and
    identifying an increased level of alertness of the driver, based on the direction of movement of gaze being away and outward from the vanishing point, wherein the identifying of the alertness of the driver is further based on if a distance between two gaze point pairs, in an outward direction from the vanishing point, is increasing.

\* \* \* \* \*